(12) United States Patent
Andrieux et al.

(10) Patent No.: US 6,384,960 B1
(45) Date of Patent: May 7, 2002

(54) PHOTOACTIVATED METHOD AND DEVICE FOR BROADBAND LIMITATION OF A LUMINOUS FLUX

(75) Inventors: Marc Andrieux, Saint Germain en Laye; Fernande Lafonta, Paris; Didier Riehl, Montrouge; Laurent Vivien, Paris; Eric Anglaret, Montpellier; Patrick Bernier, Castries; Monique Brunet, Montpellier; Christophe Goze, Cournonterral; Catherine Journet, La Seyne sur Mer; François Hache, Villejuif, all of (FR)

(73) Assignee: Delegation Generale pour l'Armement, Armees (FR)

( * ) Notice: Subject to any disclaimer, the term of this patent is extended or adjusted under 35 U.S.C. 154(b) by 0 days.

(21) Appl. No.: 09/460,994

(22) Filed: Dec. 15, 1999

(30) Foreign Application Priority Data

Dec. 15, 1998 (FR) .............................. 98 15820

(51) Int. Cl.[7] .............................. G02F 1/29; G02F 1/03; H01J 40/14; G01N 21/00
(52) U.S. Cl. ........................ 359/299; 359/245; 359/452; 250/214.1; 356/441
(58) Field of Search ................... 359/299, 452, 359/245, 337, 321, 332, 326, 241; 250/214.1; 356/441; 343/786

(56) References Cited

U.S. PATENT DOCUMENTS

| | | | |
|---|---|---|---|
| 5,280,169 A | | 1/1994 | Honey et al. ................ 250/216 |
| 5,391,329 A | | 2/1995 | Dougherty et al. ........... 264/1.7 |
| 5,640,705 A | * | 6/1997 | Koruga ......................... 588/16 |
| 5,741,442 A | | 4/1998 | McBranch et al. .......... 252/582 |
| 5,773,706 A | * | 6/1998 | Wesley et al. ................. 44/266 |
| 5,805,326 A | | 9/1998 | Snow et al. ................. 359/241 |
| 6,097,138 A | * | 8/2000 | Nakamoto ................... 313/309 |

FOREIGN PATENT DOCUMENTS

| | | |
|---|---|---|
| EP | 0 538 864 A2 | 4/1993 |
| EP | 0 679 610 a1 | 11/1995 |

\* cited by examiner

*Primary Examiner*—Georgia Epps
*Assistant Examiner*—Tim Thompson
(74) *Attorney, Agent, or Firm*—Oliff & Berridge, PLC

(57) ABSTRACT

The invention relates in particular, to the area of devices or systems whose optical operation is modified by changing the optical properties of the medium of which they are formed and that are intended, in particular, for limiting the luminous intensity transmitted by the system. Specifically, the invention relates to a device for selectively limiting the intensity of a radiation, including a liquid or solid medium containing nanotubes, for example, nanotubes made of carbon or boron, tungsten, silicon, or composite nanostructures, such as BN, BC3, BC2N, CN(C3N4), or MoS2.

23 Claims, 2 Drawing Sheets

PHOTOACTIVATED METHOD AND DEVICE FOR BROADBAND LIMITATION OF A LUMINOUS FLUX

BACKGROUND OF THE INVENTION

1. Field of Invention

The present invention relates in particular to the area of devices or systems whose optical operation is modified by changing the optical properties of the medium of which they are formed and that are intended in particular for limiting the luminous intensity transmitted by the system. In particular, it relates to a broadband photoactivated device for limiting luminous flux and can be used, for example, to protect an optronic sensor or the eye against aggressions from intense radiation, such as that emitted by a pulsed laser.

2. Description of Related Art

The development of intense light sources, possibly pulsed, wavelength-tunable light sources, has brought about the need to protect optical systems such, as the human eye or detectors operating in visible or infrared ranges that could be subjected to radiation from such a source.

This protection consists of placing an optical limitation device between the system to be protected and the source. This device should preferably have a good transmission coefficient in the case of incident radiation whose intensity is insufficient to damage the detector or any observation system and react immediately to high-luminous-flux incident radiation that could damage the detector. The protective response results in a decreased transmission coefficient so that the luminous flux emerging from the optical limitation device is insufficient to damage the detector or observation system.

Of all the devices able to attenuate radiation and having the aforesaid optical limitation devices, four types may be cited.

The first type of device uses suspended carbon particles that may be in the form of India ink highly diluted in a liquid. This type of device transmits ambient light perfectly but its optical properties change when it is subjected to very-high-intensity radiation, such as that emitted by a pulsed laser, and this change tends to decrease transmission. The luminous flux leaving the device is hence less than that entering the device.

This type of device gives good results in terms of protection against luminous fluxes with wavelengths from the visible to the near infrared, but its implementation raises many problems, such as that of keeping the carbon particles in suspension.

The second type of device relates to Christiansen filters made of small pieces of glass immersed in a liquid whose refractive index is equal to that of the glass but which varies under the influence of high-intensity radiation. Thus, this device is transparent to low- and medium-intensity radiation and becomes a diffuser when high-intensity radiation passes through it. The luminous flux at the output of the device is hence less than that at the input.

The third type relates to crystalline colloidal filters which are particles suspended in a liquid that have the particular property of organizing into a crystal-like structure. The liquid is chosen so that its refractive index is equal to that of the particles but varies under the influence of high-intensity radiation.

Thus, this device is transparent to low- and medium-intensity radiation and becomes diffracting when high-intensity radiation passes through it.

Christiansen filters and colloidal filters have one major drawback. That is, under some circumstances, they are spectrally selective, meaning that they have the aforesaid properties only for one wavelength or for a restricted wavelength range. Thus, this type of filter is, for example, unsuitable for protecting an optronic device against the radiation emitted by a pulsed wavelength-tunable laser system.

The fourth type is described in patent EP538864 and relates to the use of fullerenes, such as C60 to limit the intensity of visible radiation by the effect of reverse saturable absorption. However, beyond visible radiation, for example, at a wavelength of 800 nm, this C60 is no longer effective and, to obtain good efficiency over a wavelength range not confined to visible radiation, it is necessary to use it in combination with higher-order fullerenes, such as C70 or C80. However, using such a complex combination of materials is difficult because it requires toxic solvents to be used and hence restrictive measures to be taken to ensure manufacturing safety.

SUMMARY OF THE INVENTION

The goal of the invention is to overcome these drawbacks by providing a device able to transmit low- or medium-intensity incident radiation, namely radiation unlikely to damage an optical system, such as a detector or the human eye, and immediately to attenuate incident radiation whose intensity could damage the optical system, and do so over a large wavelength range.

The solution is a photoactivated device that limits the luminous flux of radiation, constituted by a liquid or solid medium containing nanotubes, for example, nanotubes made of carbon or boron, tungsten, silicon, or composite nanostructures, such as BN, BC3, BC2N, CN(C3N4), or MoS2. According to one particular characteristic, the medium has single-wall and/or multi-wall carbon nanotubes. These carbon nanotubes may be of a known type and can be made, for example, with an electric arc, by laser ablation, with a solar oven, or chemically.

According to another particular characteristic, the medium may include, carbon nanotubes doped or functionalized with chemical entities chosen from iodine, krypton, argon, the OH group, metals or semiconductor materials, or materials with optically nonlinear properties. According to one particular characteristic, the carbon nanotubes may be suspended in a liquid or incorporated into a gel or into a solid matrix.

According to an additional characteristic, the solid matrix may include at least one polymer, which may or may not be mesomorphic, or by a solgel, possibly in combination with a liquid crystal.

According to a particular characteristic, a generator for generating a variable-frequency electrical field and/or a magnetic field and/or an induction may be associated with the medium for orienting the nanotubes. According to another characteristic, the generator for generating an induction may be associated with the matrix.

The invention also relates to a detector of the type having at least one objective and one radiation-sensitive element Rs and having a device for limiting a luminous flux according to any of the above-listed characteristics.

The invention also relates to a photoactivated method for broadband limitation of the luminous flux of a radiation, including placing a medium that includes a liquid or solid medium containing nanotubes, for example, nanotubes of carbon or boron, tungsten, silicon, or composite nanostructures, such as BN, BC3, BC2N, CN(C3N4), or MoS2, in the path of this radiation.

A device according to the invention enables the incident luminous flux to be attenuated starting from a certain threshold. When the luminous flux is low or moderate, which is the case with ambient light, the medium constituted by the medium containing the nanotubes appears as a transparent medium. The incident luminous flux Ri is then practically unattenuated because about 80% or even more of this flux passes through it.

When the device receives a high level of luminous flux, the luminous flux leaving it has a flux limited to a value compatible with the normal operation of an optronic system. The incident luminous flux activates protection when this threshold is exceeded. The medium is thus self-activated by the flux. When the device no longer receives a high level of luminous flux, it appears as a transparent system once more.

The invention can, in particular, be applied to optronic devices, such as, for example, a TV camera or missile seeker.

A device according to the invention is broadband. Thus, it may operate, in particular, in the visible range and in the near infrared range.

BRIEF DESCRIPTION OF THE DRAWINGS

Other advantages and characteristics will emerge from the description of a particular embodiment applied to a device and with reference to the attached Figs. wherein.

DETAILED DESCRIPTION OF PREFERRED EMBODIMENTS

Figure 1A:
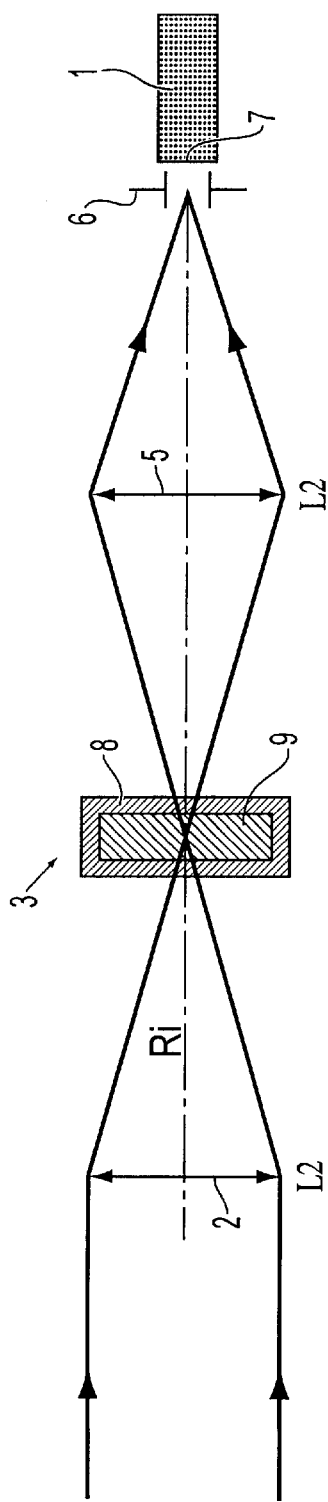
FIGS. 1a and 1b show schematically the operation of a device according to the invention applied to a detector.
Figure 1B:
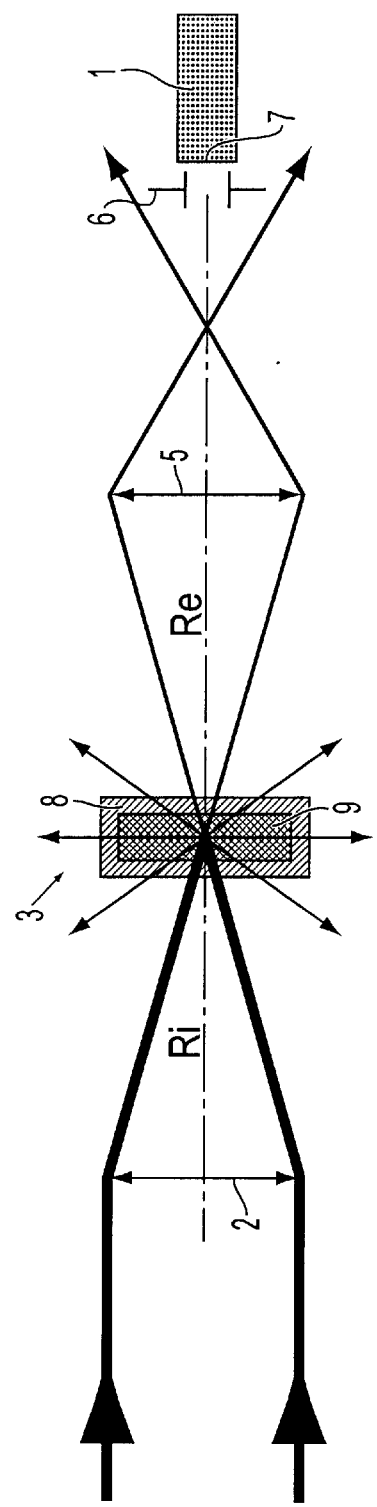

FIGS. 1a and 1b show a particular application of the invention, namely an optronic device. This optronic device has a CCD camera 1 transmitting a video image to a processor able to determine the position of a target in this image.

When an intense luminous flux, such as that emitted by a pulsed frequency-tunable laser, is directed at the photosensitive elements of this camera, the latter deteriorate and the camera becomes unusable.

The imaging optics of the camera are adapted to avoid such deterioration. These imaging optics include a converging lens 2, a flux limiting device 3 according to the invention for selectively limiting the incident luminous flux, and an objective 5, 6 able to form the optical image of the visual field filmed on the sensitive elements 7 of the camera.

The flux limiting device 3, located in an intermediate focal plane of the imaging optics, has an envelope 8 made of a material optically transparent to the emission frequencies of a pulsed frequency-tunable laser. The envelope containing a medium 9 includes carbon nanotubes made by a technique employing an electric arc and suspended in a liquid.

Single-wall nanotubes, approximately 13 angstroms in diameter and between 0.3 and 300 $\mu$ long and multi-wall nanotubes approximately 100 angstroms in diameter and a few microns long, have been made.

To demonstrate the effectiveness of the nanotubes, they are suspended in water, which has no optical limiting behavior, so that the effectiveness of optical limitation can be seen to be due only to the nanotubes.

The thickness of flux limiting device 3 limiting luminous flux Ri is 1 mm. It corresponds to the length of the optical path of radiation Ri in this device.

Figure 2:
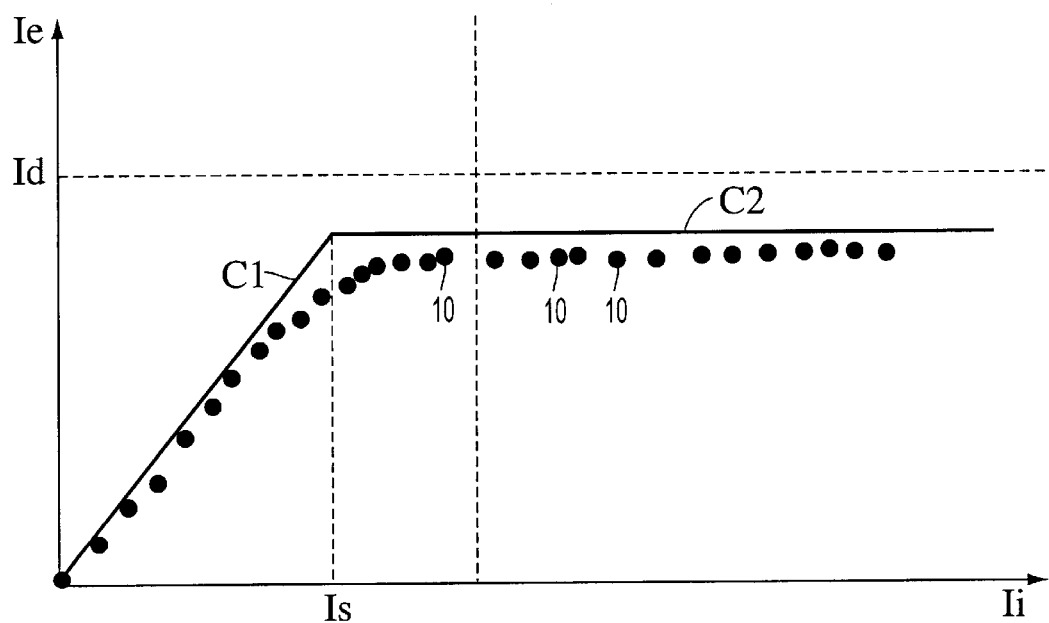
FIG. 2 shows a luminous flux curve emerging from the device according to the invention as a function of the incident luminous flux.

FIG. 2 shows two curves of which C1, was produced by modeling, while C2 is an experimental curve of black dots 10. The intensity Ii of the incident radiation Ri entering flux limiting device 3 for limiting the luminous flux is on the horizontal axis and the luminous flux emerging from this device on the vertical axis. These curves have two distinct parts. The first part, corresponding to flux values less than the threshold value Is, shows proportionality between the intensity Ii of the incident radiation Ri and the intensity of the emerging luminous flux. This flux limiting device 3 for optical limitation ensures linear transmission greater than 80% over the entire visible plus infrared spectrum up to a threshold value S of incident radiation intensity. The second part, corresponding to incident flux values higher than the threshold value Is, shows that, for any intensity value Ii of incident radiation Ri, the emerging luminous flux value remains essentially constant and less than an intensity value Id likely to damage the camera, whatever the wavelength of the incident radiation.

The carbon nanotubes attenuate high-intensity incident radiation by nonlinear refraction, nonlinear diffusion, and nonlinear absorption.

The activation threshold, namely the threshold beyond which the incident luminous flux is limited, is substantially less than that of carbon black suspensions at wavelengths of 532 nm and 1064 nm. It should be noted that this activation threshold is substantially the same in the visible and near infrared wavelength range.

Numerous modifications may be made without departing from the framework of the invention.

What is claimed is:

1. A photoactivated device that limits the luminous flux of radiation, comprising:

a medium containing nanotubes, the medium being placed in the path of the radiation.

2. The photoactivated device of claim 1, wherein the nanotubes comprise one of carbon, boron, tungsten, silicon, BN, BC3, BC2N, CN(C3N4), and MoS2.

3. The photoactivated device of claim 1, wherein the medium is a liquid.

4. The photoactivated device of claim 1, wherein the medium is a solid.

5. The photoactivated device of claim 1, wherein the medium comprises single-wall and multi-wall carbon nanotubes.

6. The photoactivated device of claim 1, wherein the medium comprises one of single-wall and multi-wall carbon nanotubes.

7. The photoactivated device of claim 1, wherein the medium comprises carbon nanotubes are doped with chemical entities chosen from iodine, krypton, argon, the OH group, metals, semiconductor materials, or materials with optically nonlinear properties.

8. The photoactivated device of claim 1, wherein the nanotubes are carbon nanotubes suspended in a liquid.

9. The photoactivated device of claim 1, wherein the nanotubes are incorporated into a gel.

10. The photoactivated device of claim 1, wherein the nanotubes are incorporated into a solid matrix.

11. The photoactivated device of claim 10, wherein the solid matrix is formed of at least one polymer.

12. The photoactivated device of claim 11, wherein the polymer is one of a mesomorphic polymer, a nonmesomorphic polymer, or a solgel.

13. A detector, comprising:
at least one objective, wherein at least one of the at least one objectives being sensitive to radiation; and
a photoactivated luminous flux limiting device comprising a medium containing nanotubes, the photoactivated luminous flux limiting device being placed in the path of the radiation.

14. The detector of claim 13, wherein the medium is a liquid.

15. The detector of claim 13, wherein the medium is a solid.

16. The detector of claim 13, wherein the nanotubes comprise one of carbon, boron, tungsten, silicon, BN, BC3, BC2N, CN(C3N4), or MoS2.

17. The detector of claim 13, wherein the medium comprises single-wall and multi-wall carbon nanotubes.

18. The detector of claim 13, wherein the medium comprises one of single-wall and multi-wall carbon nanotubes.

19. A method for limiting the luminous flux of radiation, comprising:
placing a medium comprising a medium containing nanotubes in the path of this radiation.

20. The method of claim 19, wherein the nanotubes comprise one of carbon, boron, tungsten, silicon, BN, BC3, BC2N, CN(C3N4), and MoS2.

21. The photoactivated device of claim 1, wherein the photoactivated device is located in an atmosphere having a pressure above a vacuum.

22. The photoactivated device of claim 21, wherein the atmosphere above a vacuum is at ambient atmospheric pressure.

23. The photoactivated device of claim 1, wherein the photoactivated device does not comprise an electrode.

* * * * *